US012488648B2

(12) United States Patent
Kaswan et al.

(10) Patent No.: US 12,488,648 B2
(45) Date of Patent: Dec. 2, 2025

(54) CASH TRANSPORT SYSTEM

(71) Applicant: Glory Ltd., Himeji (JP)

(72) Inventors: Madanmohan Kaswan, Himeji (JP); Yuki Hashitani, Himeji (JP); Yanan Zhao, Himeji (JP); David Sharpe, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/822,568

(22) Filed: Sep. 3, 2024

(65) Prior Publication Data

US 2024/0428639 A1 Dec. 26, 2024

Related U.S. Application Data

(63) Continuation of application No. PCT/JP2023/006058, filed on Feb. 20, 2023.

(30) Foreign Application Priority Data

Mar. 4, 2022 (JP) ................................ 2022-033449

(51) Int. Cl.
*G07D 11/245* (2019.01)

(52) U.S. Cl.
CPC ....... *G07D 11/245* (2019.01); *G07D 2211/00* (2013.01)

(58) Field of Classification Search
CPC .... G07D 11/245; G07D 2211/00; G07D 9/00; G07D 11/20; G07D 11/24; G06Q 10/08; G06Q 40/02
See application file for complete search history.

(56) References Cited

U.S. PATENT DOCUMENTS 8,567,585 B2 10/2013 Okamura et al.
11,334,893 B1 * 5/2022 Mattison, Sr. ........... G07D 7/00
(Continued)

FOREIGN PATENT DOCUMENTS

CN 113963478 A 1/2022
JP 2015-094987 A 5/2015
(Continued)

OTHER PUBLICATIONS

International Search Report and Written Opinion mailed on Apr. 18, 2023, received for PCT Application PCT/JP2023/006058, filed on Feb. 20, 2023, 08 pages including English Translation.

*Primary Examiner* — Tuyen K Vo
(74) *Attorney, Agent, or Firm* — XSENSUS LLP

(57) ABSTRACT

A cash transport system includes a cash handling apparatus installed in a store, and a management device. The management device includes circuitry configured to: determine whether cash transport to the store for replenishing the cash handling apparatus with cash is necessary; determine whether cash transport from the store for collecting cash from the cash handling apparatus is necessary; in a case that the circuitry has determined that any of the cash transport to the store and the cash transport from the store is necessary, calculate, based on one currency selected in advance from among the plurality of currencies, a transport amount by converting the amounts of cash of currencies to be transported into amounts of the selected currency and summing up the converted amounts; and in a case that the transport amount exceeds a upper-limit amount, notify a communication terminal that the transport amount exceeds the upper-limit amount.

20 Claims, 8 Drawing Sheets

(56) References Cited

U.S. PATENT DOCUMENTS

| | | | | |
|---|---|---|---|---|
| 12,046,111 | B2 * | 7/2024 | Brancaccio | G07F 19/20 |
| 2010/0025183 | A1 * | 2/2010 | Folk | G07F 19/20 194/200 |
| 2021/0134102 | A1 | 5/2021 | Chen et al. | |
| 2021/0225115 | A1 * | 7/2021 | Yamashita | G07G 1/14 |
| 2021/0327198 | A1 * | 10/2021 | Yukawa | G07D 11/25 |
| 2022/0230502 | A1 * | 7/2022 | Tagashira | G07D 11/34 |

FOREIGN PATENT DOCUMENTS

| | | | |
|---|---|---|---|
| JP | 2017-097866 | A | 6/2017 |
| JP | 2020-170295 | A | 10/2020 |
| JP | 2021-071852 | A | 5/2021 |
| JP | 2021-114101 | A | 8/2021 |

* cited by examiner

FIG.3

CASH QUANTITY SETTING

| CURRENCY | DENOMINATION | MINIMUM QUANTITY | IDEAL QUANTITY | MAXIMUM QUANTITY |
|---|---|---|---|---|
| U.S. | ☑ 100 DOLLARS<br>☑ 50 DOLLARS<br>⋮ | 12···<br>12···<br>⋮ | 12···<br>12···<br>⋮ | 12···<br>12···<br>⋮ |
| MEXICO | ☑ 1000 PESOS<br>☑ 500 PESOS<br>⋮ | 12···<br>12···<br>⋮ | 12···<br>12···<br>⋮ | 12···<br>12···<br>⋮ |
| ⋮ | | | | |

CASH TRANSPORT SYSTEM

CROSS-REFERENCE TO RELATED APPLICATIONS

The present application is a bypass continuation of, and claims priority to, International application PCT/JP2023/006058, filed Feb. 20, 2023, which claims priority to JP 2022-033449, filed Mar. 4, 2022, and the entire contents of both are incorporated herein by reference.

TECHNICAL FIELD

The present disclosure relates to a cash transport system for cash transport of a plurality of types of currencies.

BACKGROUND

Conventionally, cash handling apparatuses for handling cash are used in various places. For example, in a store where a transaction with a customer is performed, a cash handling apparatus is used for handling cash that the customer pays for the transaction. Such a cash handling apparatus calculates a total amount of cash that the customer has deposited into the apparatus, and stores the cash inside the apparatus. In addition, the cash handling apparatus dispenses a change obtained by subtracting the transaction amount from the total amount, according to need. In a case where the cash inside the apparatus increases and cash cannot be deposited any more, or the cash inside the apparatus decreases and a change cannot be dispensed, the cash handling apparatus cannot be used for the transaction. Therefore, in order to keep the types and quantities of cash stored in the cash handling apparatus in an appropriate state, a cash-in-transit (CIT) company that performs cash-in-transit services collects cash from the store, and delivers cash to the store.

Some cash handling apparatuses are provided with a collection container for storing therein cash to be collected to the outside of the apparatus. The cash-in-transit company can easily collect cash by dismounting the collection container from the cash handling apparatus. Conventionally, an apparatus may set in advance, as a limit sum, an upper-limit of cash that a cash-in-transit company transports, thereby limiting the total amount of cash to be stored in a collection container to the limit sum or less. For example, such a limit sum is set when the amount of cash to be transported needs to be limited in consideration of safety during transport, or when the amount of cash to be transported needs to be limited according to the content of an insurance contract covering the cash to be transported.

SUMMARY

A cash transport system according to one aspect of the present disclosure includes a cash transport system comprising one or more cash handling apparatuses that are installed in a store and are configured to handle a plurality of currencies of cash; and a management device including circuitry. The circuitry is configured to determine whether cash transport to the store for replenishing the cash handling apparatus with cash is necessary; determine whether cash transport from the store for collecting cash from the cash handling apparatus is necessary; in a case that the circuitry has determined that any of the cash transport to the store and the cash transport from the store is necessary, calculate, based on one currency selected in advance from among the plurality of currencies, a transport amount by converting the amounts of cash of currencies to be transported into amounts of the selected currency and summing up the converted amounts; and in a case that the transport amount exceeds a upper-limit amount, notify a communication terminal that the transport amount exceeds the upper-limit amount.

The objects, features, advantages, and technical and industrial significance of this disclosure will be better understood by the following description and the accompanying drawings of the disclosure.

BRIEF DESCRIPTION OF THE DRAWINGS

FIG. 3 shows an example of a setting screen related to a cash handling apparatus.

DETAILED DESCRIPTION

The inventors of the present disclosure have recognized problems with conventional systems, in that they cannot flexibly cope with various cash transport methods. For example, since the conventional systems are based on a premise of transporting the currency of the country where the store is located, if currencies of a plurality of countries are used in the store, the conventional art cannot cope with cash transport of these currencies.

The inventors have developed technology of the present disclosure in which a cash transport system capable of flexibly coping with various cash transport methods.

Figure 1:
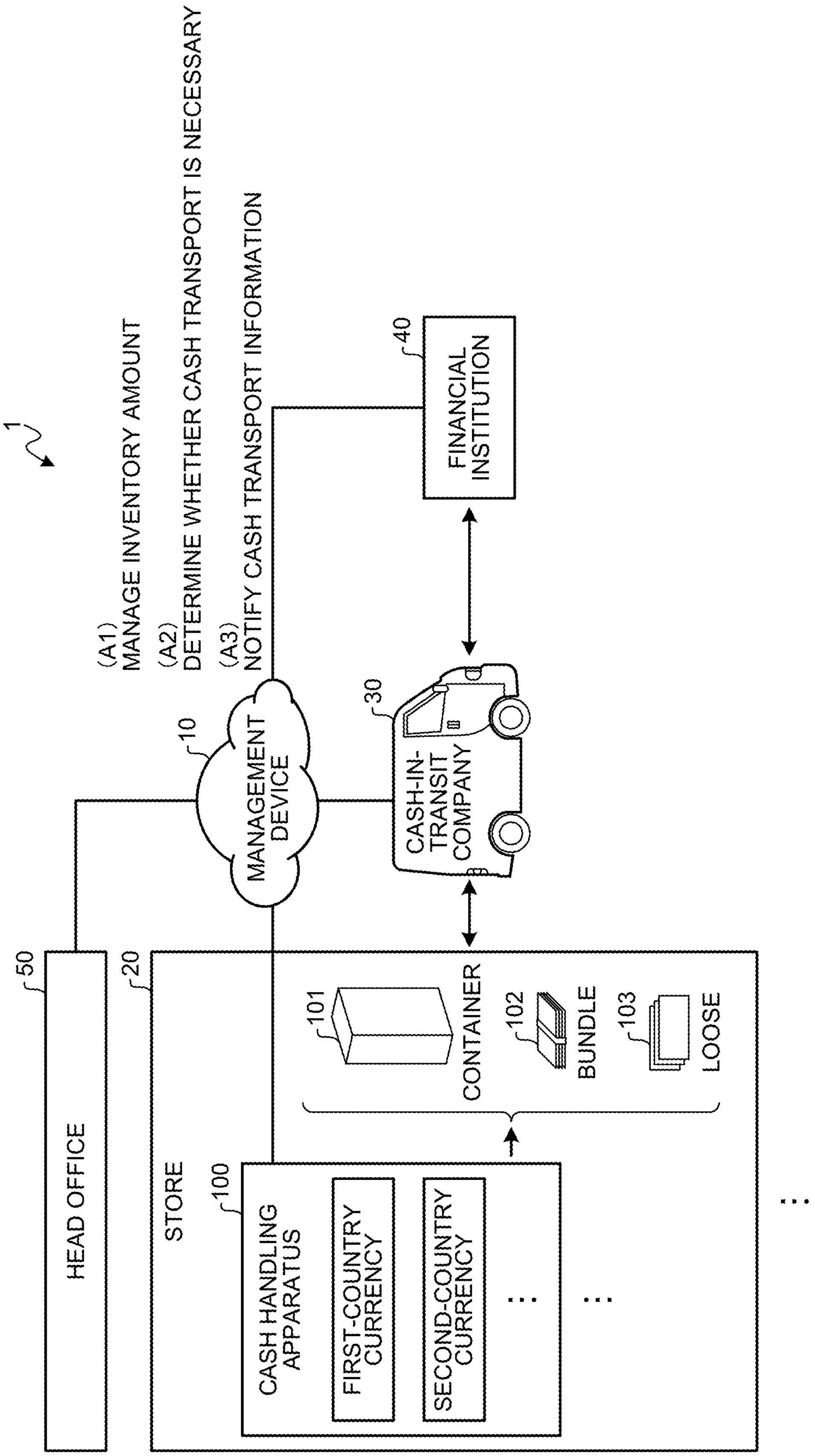
FIG. 1 is a schematic diagram illustrating an outline of a cash transport system according to an embodiment of the present disclosure.

Hereinafter, an embodiment of a cash transport system according to the present disclosure will be described with reference to the accompanying drawings. FIG. 1 is a schematic diagram illustrating an outline of a cash transport system 1 according to the present embodiment.

The cash transport system 1 is a cloud system built on the Internet. In the cash transport system 1, a management device 10, which is a could server, provides a cloud service related to cash transport. The management device 10 is not limited to an insubstantial, virtual device. A server including a computer device may be used as the management device 10.

The cash transport system 1 includes the management device 10, and a cash handling apparatus 100 capable of handling a plurality of currencies including a first-country currency and a second-country currency. Although FIG. 1 shows an example of the cash handling apparatus 100 installed in a store 20, the installation place of the cash handling apparatus 100 is not particularly limited. In an exemplary implementation, either or both of management device 10 and cash handling apparatus 100 may include circuitry or processing circuitry which includes general purpose processors, special purpose processors, integrated circuits, ASICs ("Application Specific Integrated Circuits"), FPGAs ("Field-Programmable Gate Arrays"), conventional circuitry and/or combinations thereof which are programmed, using one or more programs stored in one or more memories, or otherwise configured to perform the disclosed functionality. Processors and controllers are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

Also, the types and the number of cash handling apparatuses 100 included in the cash transport system 1 are not particularly limited. For example, the cash handling apparatus 100 may be an apparatus used for checkout, a money changer, a vending machine, or the like. The cash transport system 1 may include a plurality of cash handling apparatuses 100 installed in one store 20. The cash transport system 1 may include cash handling apparatuses 100 respectively installed in a plurality of stores. The types and the number of currencies that the cash handling apparatus 100 can handle are not particularly limited. Cash of three or more types of currencies may be handled in the cash handling apparatus 100. Hereinafter, the description will be continued for an exemplary case where the cash handling apparatus 100, which is used for transactions between the store 20 and customers, handles a currency (home currency) of a country where the store 20 is located, as the first-country currency, and handles a currency (foreign currency) different from the currency of the country where the store 20 is located, as the second-country currency. A "denomination" described in the present embodiment may include information indicating a currency. For example, in the case where the first-country currency is the currency of the United States and the second-country currency is the currency of Canada, the difference between 1-dollar notes of the United States and 1-dollar notes of Canada may be referred to as a difference in denomination.

The cash handling apparatus 100 is installed in the store 20 in which transactions with customers are performed. When a customer pays cash for a transaction amount in a transaction, a depositing process of the cash is performed by using the cash handling apparatus 100. The cash handling apparatus 100 can recognize and count, with a recognition unit, cash deposited from an inlet, and store the cash into a storage unit inside the apparatus. The cash handling apparatus 100 can perform a depositing process of the first-country currency and a depositing process of the second-country currency. When a change is to be returned to the customer in the transaction, a dispensing process of the change is performed by using the cash handling apparatus 100. The cash handling apparatus 100 can dispense, from an outlet, the change fed out from the storage unit in the apparatus. The cash handling apparatus 100 can perform a dispensing process of the first-country currency and a dispensing process of the second-country currency.

The cash handling apparatus 100 may be able to perform other cash handlings such as a money exchange process, a cash-out process (i.e., dispensing, by cash, an amount withdrawn from a customer's account), and the like. The cash handling apparatus 100 may be provided with a collection unit to/from which a collection container such as a bag or a cassette is mountable/dismountable, and may be able to perform a collection process for storing, in the collection container, cash to be collected to the outside of the apparatus. The cash handling apparatus 100 may be able to perform a wrapping process for creating wrapped cash by bundling or wrapping a predetermined quantity of cash. The cash handling apparatus 100 may be able to perform a bundle dispensing process for dispensing wrapped cash. Since the configuration and operation of a cash handling apparatus that includes components such as an inlet, an outlet, a recognition unit, a storage unit, and a collection unit, and performs cash handlings such as a depositing process, a dispensing process, a money exchange process, a cash-out process, a collection process, a wrapping process, and a bundle dispensing process, are conventionally known, detailed description thereof will be omitted.

When the cash handling apparatus 100 has performed cash handling, and at least one of the type and the quantity of cash stored in the apparatus has been changed, the cash handling apparatus 100 transmits information on this change to the management device 10. For example, when cash handling has been performed and cash of the first-country currency stored in the cash handling apparatus 100 has increased or decreased, denominations and the quantity for each denomination of the first-country currency having increased or decreased are transmitted to the management device 10. Likewise, when cash handling has been performed and cash of the second-country currency stored in the cash handling apparatus 100 has increased or decreased, denominations and the quantity for each denomination of the second-country currency having increased or decreased are transmitted to the management device 10.

As shown in FIG. 1, the management device 10 can manage the inventory amount of the cash stored in the cash handling apparatus 100 (A1). Inventory information managed by the management device 10 includes: the denominations and the quantity for each denomination of the first-country currency currently stored in the cash handling apparatus 100; and the denominations and the quantity for each denomination of the second-country currency currently stored in the cash handling apparatus 100. If the cash handling apparatus 100 is provided with a collection unit to/from which a collection container is mountable/dismountable, and can store cash to be collected, into the collection container, the inventory information managed by the management device 10 includes the currency, the denominations of each currency, and the quantity for each denomination of the cash currently stored in the collection unit.

The management device 10 can determine whether or not cash transport by a cash-in-transit company 30 is necessary, based on the inventory information (A2). The management device 10 performs at least one of determination for necessity of cash delivery to the store 20, and determination for necessity of cash collection from the store 20.

For example, the necessity for cash transport is determined based on replenishment condition for determining whether or not replenishment of the cash handling apparatus 100 with cash is necessary. When the cash in the cash handling apparatus 100 decreases and the replenishment condition is satisfied, the management device 10 determines that cash transport for delivering cash to the store 20 is necessary. For another example, the necessity for cash transport is determined based on a collection condition for determining whether or not cash collection from the cash handling apparatus 100 is necessary. When the cash in the cash handling apparatus 100 increases and the collection condition is satisfied, the management device 10 determines that cash transport for collecting cash from the store 20 is necessary.

When a plurality of cash handling apparatuses 100 are installed in one store 20, a single replenishment condition and a single collection condition for determining whether or not cash transport is necessary, may be set for cash stored in the plurality of cash handling apparatuses 100. When a cash handling apparatus 100 is installed in each of a plurality of stores, a single replenishment condition and a single collection condition for determining whether or not cash transport is necessary, may be set for the plurality of cash handling apparatuses 100. Specifically, based on a value obtained by summing up the quantities of cash of the same denomination stored in the plurality of cash handling apparatuses, whether or not replenishment is necessary and whether or not collection is necessary, i.e., whether or not cash transport is necessary, may be determined.

Upon determining that cash transport is necessary, the management device 10 can notify a predetermined notification destination of information on the cash transport (A3). The information to be notified includes at least one of transport information including a cash transport source and a cash transport destination, and cash information including the currencies, the denominations, and the quantity for each denomination of cash to be transported. The notification destination includes at least one of the store 20, the cash-in-transit company 30, a financial institution 40, and a head office 50 that manages the store 20. The notification is performed by, for example, transmitting at least one of the transport information and the cash information to communication terminals being used at the locations of the store 20, the cash-in-transit company 30, the financial institution 40, and the head office 50. Upon receiving the notification from the management device 10, each of the store 20, the cash-in-transit company 30, the financial institution 40, and the head office 50 can start work related to the cash transport. The cash transport system 1 has a feature in that, when an amount of cash to be transported exceeds a predetermined upper-limit amount, a notification on the information indicating this fact is performed, which will be described later.

Next, cash transport for cash to be delivered to the store 20 will be described. When the cash in the cash handling apparatus 100 decreases and replenishment with cash becomes necessary, the management device 10 performs a notification for notifying cash information on cash to be transported from the financial institution 40 to the store 20. The cash information includes the denominations and the quantity for each denomination of cash for replenishment, with which the cash handling apparatus 100 is replenished.

Upon receiving the notification from the management device 10, the cash-in-transit company 30 may receive cash at the financial institution 40 and deliver the cash to the store 20. Upon receiving the notification from the management device 10, the store 20 may receive the cash delivered to the store 20 by the cash-in-transit company 30, and replenish the cash handling apparatus 100 with the cash.

Upon receiving the notification from the management device 10, the financial institution 40 may start preparation for cash to be transported to the store 20. The financial institution 40 may perform account handling in which the amount of the cash to be transported from the financial institution 40 to the store 20 is withdrawn from an account of the store 20 or an account of the head office 50. For example, the management device 10 notifies an external device, which performs the account handling, of the transport amount and information on the account from which the transport amount is withdrawn. The external device performs the account handling based on the notification. The external device that performs the account handling is a server of the financial institution 40, for example.

When the cash-in-transit company 30 receives the cash from the financial institution 40, the account handling is performed on the assumption that the store 20 has withdrawn the cash from the account. For example, when receiving the cash from the financial institution 40, the cash-in-transit company 30 performs a predetermined operation of notifying the management device 10 of information on the reception of the cash to be transported. Upon receiving the notification, the management device 10 requests the external device to perform the account handling.

The account handling may be performed as a provisional withdrawal before the cash-in-transit company 30 receives the cash from the financial institution 40, i.e., before starting the cash transport. For example, the external device may perform the account handling, as the provisional withdrawal, when receiving the request on the account handling from the management device 10 that has determined to perform the cash transport. When the cash-in-transit company 30 has received the cash from the financial institution 40, the cash-in-transit company 30 may perform the predetermined operation for notifying the management device 10 of information on the reception. Upon receiving the notification, the management device 10 may request the external device to finalize the account handling, and the external device may finalize the account handling for withdrawal performed as the provisional withdrawal. The cash-in-transit company 30 may transmit a notification to the external device, and the external device may finalize the account handling for withdrawal.

Next, cash transport for cash to be collected from the store 20 will be described. When the cash stored in the cash handling apparatus 100 increases and collection of cash to the outside of the apparatus becomes necessary, the management device 10 performs a notification for notifying cash information on cash to be transported from the store to the financial institution 40. The cash information include the denominations and the quantity for each denomination of the cash to be collected from the store 20.

Upon receiving the notification from the management device 10, the store 20 may take out the cash to be collected, from the cash handling apparatus 100 to start preparation for cash collection. Upon receiving the notification from the management device 10, the cash-in-transit company 30 may collect the cash from the store 20, and transport the cash to the financial institution 40.

Upon receiving the notification from the management device 10, the financial institution 40 may perform account handling in which the amount of the cash to be transported from the store 20 to the financial institution 40 is deposited in the account of the store 20 or the account of the head office 50. For example, the management device 10 notifies the external device, which performs the account handling, of the transport amount and information on the account in which the transport amount is to be deposited. The external device performs the account handling based on the notification. The external device that performs the account handling is the server of the financial institution 40, for example.

When the cash-in-transit company 30 has transported the cash to the financial institution 40, the account handling is performed on the assumption that the store 20 has deposited the cash in the account. For example, when the cash-in-transit company 30 has delivered the transported cash to the financial institution 40, the cash-in-transit company 30 performs a predetermined operation for notifying the management device 10 of information on transport completion of the cash to be transported. Upon receiving the notification, the management device 10 requests the external device to perform the account handling.

The account handling may be performed as provisional depositing before the cash-in-transit company 30 delivers the cash to the financial institution 40, i.e., before completing the cash transport. For example, the external device performs the account handling, as the provisional depositing, when receiving the request on the account handling from the management device 10 that has determined to perform the cash transport. When the cash-in-transit company 30 has delivered the cash to the financial institution 40, the cash-in-transit company 30 may perform a predetermined operation for notifying the management device 10 of information on transport completion. Upon receiving the notification, the management device 10 may request the external device to finalize the account handling, and the external device may finalize the account handling for depositing performed as the provisional depositing. The cash-in-transit company 30 may transmit the notification to the external device, and the external device may confirm the account handling for depositing.

The cash handling apparatus 100 can perform a process for discharging the cash to be collected to the outside of the apparatus. The management device 10 notifies the cash handling apparatus 100 of the denominations and the quantity for each denomination of the first-country currency to be collected, and the denominations and the quantity for each denomination of the second-country currency to be collected. Upon receiving the notification, the cash handling apparatus 100 transports cash of the first-country currency and the second-country currency, which are to be collected among the cash stored in the storage unit in the apparatus, in order to move the cash from the storage unit to the collection container of the collection unit. Thus, the cash-in-transit company 30 can collect the cash by dismounting the collection container from the cash handling apparatus 100. When the cash handling apparatus 100 is configured to use a plurality of collection containers, the cash handling apparatus 100 may store the cash of the first-country currency and the cash of the second-country currency in separate collection containers.

The management device 10 may notify the cash handling apparatus 100 of a collection method in addition to the breakdown of the cash of the first-country currency and the second-country currency to be collected, whereby the cash handling apparatus 100 may prepare the cash to be collected by the notified collection method. As shown in FIG. 1, examples of the collection method include container collection, bundle collection, and loose collection. The container collection is a collection method in which the cash handling apparatus 100 stores cash in a predetermined collection container 101, and dismounts the collection container 101 from the apparatus. The collection container 101 may be a bag or a cassette. The bundle collection is a collection method in which the cash handling apparatus 100 dispenses wrapped cash 102. The loose collection is a collection method in which the cash handling apparatus 100 dispenses cash 103 one by one.

According to the collection method notified by the management device 10, the cash handling apparatus 100 may store the cash to be collected, into the collection container 101, or may dispense the cash in a bundled state or in a loose state. In the container collection, the store 20 or the cash-in-transit company 30 dismounts the collection container 101 from the cash handling apparatus 100 to collect the cash. In the bundle collection, when the store 20 or the cash-in-transit company 30 performs a predetermined operation on the cash handling apparatus 100, the cash handling apparatus 100 dispenses the cash of the first-country currency and the second-country currency to be collected, as wrapped cash 102. In the loose collection, when the store 20 or the cash-in-transit company 30 performs a predetermined operation on the cash handling apparatus 100, the cash handling apparatus 100 dispenses the cash 103 of the first-country currency and the second-country currency to be collected, one by one.

Next, a flow of processing related to cash transport will be described. The cash transport system 1 has a feature in that it converts the amounts of cash of the respective currencies to be transported into the amounts of a predetermined currency and sums up the amounts to calculate a total amount of cash to be transported by the amount of the predetermined currency, and supports the cash transport so that the total amount is equal to or less than a predetermined upper-limit amount.

Figure 2:
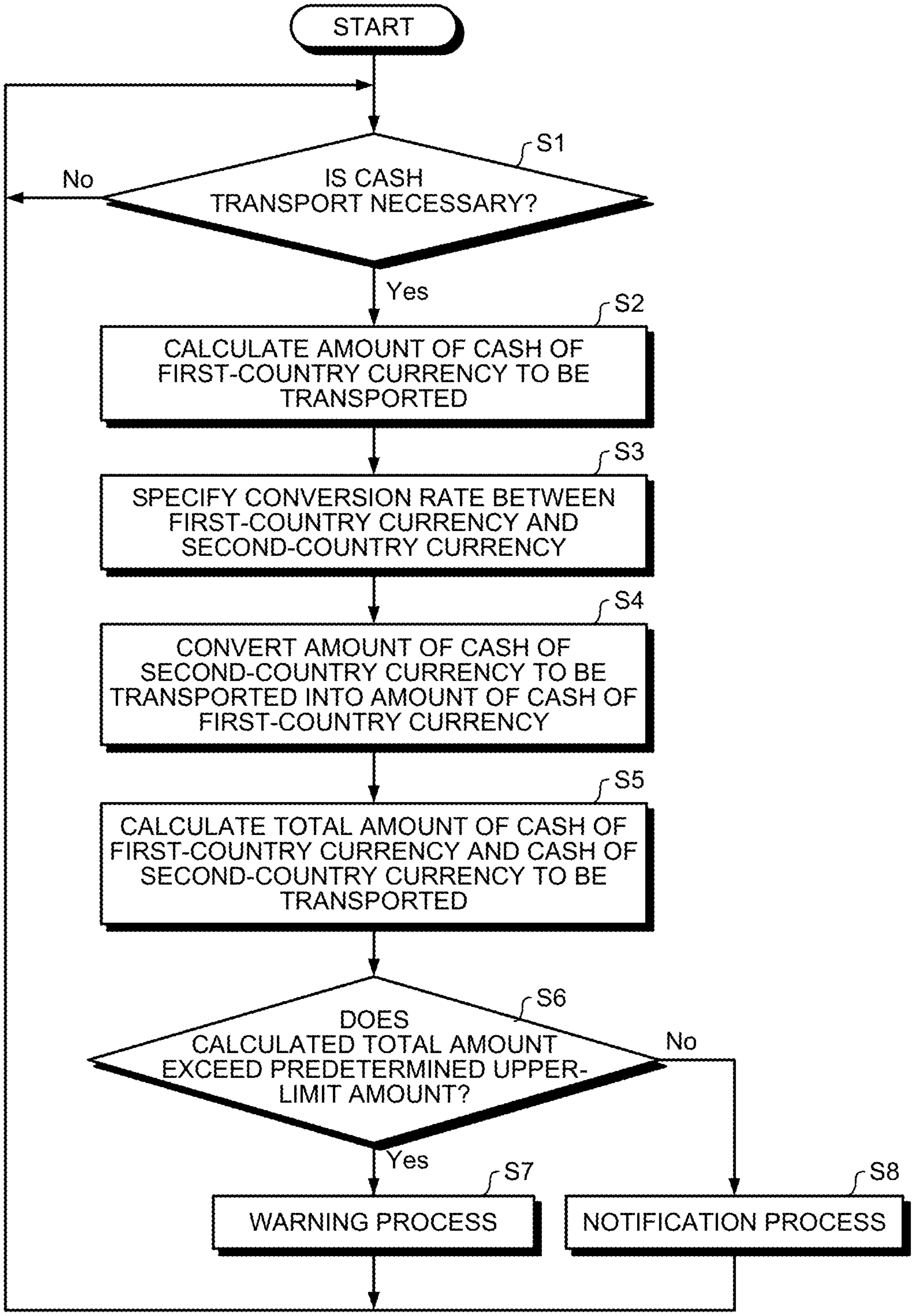
FIG. 2 is a flowchart showing a flow of processing performed by a management device.

FIG. 2 is a flowchart showing the flow of processing performed by the management device 10. The management device 10 monitors whether or not it is necessary to transport cash between the store 20 and the financial institution 40 (step S1; No).

For example, when the cash in the cash handling apparatus 100 decreases and a predetermined replenishment condition is satisfied, the management device 10 determines that it is necessary to transport cash from the financial institution 40 to the store 20 (step S1; Yes). Likewise, when the cash in the cash handling apparatus 100 increases and a predetermined collection condition is satisfied, the management device 10 determines that it is necessary to transport cash from the store 20 to the financial institution 40 (step S1; Yes). For another example, the store 20 or the head office 50 performs a predetermined manual operation for requesting the management device 10 to perform cash transport, whereby the management device 10 determines that cash transport is necessary (step S1; Yes).

When it is determined to perform the cash transport, the management device 10 calculates the amount of cash of the first-country currency among the cash to be transported (step S2). The management device 10 specifies a conversion rate between the first-country currency and the second-country currency (step S3). The management device 10 converts the amount of cash of the second-country currency among the cash to be transported, into the amount of the first-country currency by using the conversion rate (step S4). For example, the management device 10 acquires the rate of the first-country currency and the second-country currency from a predetermined website on the Internet or a predetermined external device, and uses the rate as the conversion rate. The management device 10 may use a predetermined conversion rate. A data sheet including conversion rates between currencies may be prepared in the management device 10, and the management device 10 may use a conversion rate read out from the data sheet. The management device 10 can read out a conversion rate corresponding to the types of currencies, from the data sheet in which conversion rates between a plurality of currencies are registered, and use the conversion rate for the calculation.

The management device 10 calculates a total amount of the cash of the first-country currency and the cash of the second-country currency to be transported (step S5). Specifically, the management device 10 calculates, as a transport amount, the total of the monetary amount of the first-country currency and the monetary amount of the second-country currency converted into the first-country currency.

The management device 10 determines whether or not the calculated total amount exceeds a predetermined upper-limit amount (step S6). For example, the store 20 or the head office 50 sets in advance an upper-limit amount of cash that the cash-in-transit company 30 transports in a single transport. The upper-limit amount is set by the amount of the first-country currency.

When the transport amount exceeds the upper-limit amount (step S6; Yes), the management device 10 performs a warning process (step S7). When the transport amount does not exceed the upper-limit amount (step S6; No), the management device 10 performs a notification process (step S8). In the notification process in step S8, the management device 10 performs the notification for the transport information and the cash information as described above, whereby work and processing related to cash transport are started.

In the warning process, the store 20 or the head office 50 is notified that the transport amount exceeds the upper-limit amount. On the other hand, notification to the cash-in-transit company 30 and the financial institution 40 is not performed until it is determined to perform cash transport.

Upon receiving the notification, the store 20 or the head office 50 can perform any one of: an approval operation for approving that the transport amount exceeds the upper-limit amount; a confirmation operation for changing the breakdown of the cash to be transported so that the transport amount does not exceed the upper-limit amount, and confirming the change; and an operation for canceling the cash transport. When the cancel operation has been performed, cash transport is not performed.

When changing the breakdown of the cash to be transported, an operation for changing the breakdown so that the transport amount does not exceed the upper-limit amount, and an operation for confirming the change are performed by using a communication terminal that has accessed the management device 10.

When the store 20 or the head office 50 has performed the approval operation or the confirmation operation, the management device 10 notifies the cash-in-transit company 30 and the financial institution 40 that it is determined to perform cash transport. When the breakdown of the cash to be transported has been changed, the cash-in-transit company 30 and the financial institution 40 are notified of the cash information after the change, and the cash is transported according to the changed breakdown.

In the notification process of step S8, the management device 10 may notify the store 20 or the head office 50 of the fact that the transport amount by the cash-in-transit company 30 does not exceed the upper-limit amount.

For example, after the notification to the store 20 or the head office 50, a notification from the management device 10 to the cash-in-transit company 30 and the financial institution 40 may be performed. The notification is performed on condition that an approval operation for the cash transport has been performed in the store 20 or the head office 50. After the notification to the cash-in-transit company 30 and the financial institution 40, the work and processing related to the cash transport may be started. In this case, the cash transport is canceled unless the store 20 or the head office 50 performs the approval operation.

For another example, the store 20 or the head office 50 having received the notification may be able to manually change the breakdown of the cash to be transported. For example, the management device 10 notifies a difference between the transport amount and the upper-limit amount in addition to the fact that the transport amount is less than the upper-limit amount. Upon receiving the notification, the store 20 or the head office 50 can change the breakdown of the cash to be transported so that the difference between the transport amount and the upper-limit amount approaches 0 (zero). In this case, after the store 20 or the head office 50 has manually changed the breakdown and determined to perform cash transport, the management device 10 may perform a notification to the cash-in-transit company 30 and the financial institution 40. Upon receiving the notification, the cash-in-transit company 30 and the financial institution 40 may start the work and processing related to the cash transport.

Next, setting performed in the cash transport system 1 will be described. FIG. 3 shows an example of a setting screen related to the cash handling apparatus 100. In the screens shown in FIG. 3 and subsequent figures, information is partially omitted and schematically shown. The store 20 or the head office 50 accesses the management device 10 and performs a predetermined operation through the communication terminal, whereby the setting screen shown in FIG. 3 is displayed on the screen of the communication terminal. On this screen, the store 20 or the head office 50 can set currencies, denominations, minimum quantities, ideal quantities, and maximum quantities of cash to be stored in the cash handling apparatus 100.

The screen shown in FIG. 3 shows an example of a case where the cash handling apparatus 100 handles a plurality of currencies including US currency and Mexican currency. In the examples of the screens of the present embodiment, underlined information indicates that the content of the information is changeable, and information with checkboxes indicates that the content of the information is selectable.

Regarding items shown in FIG. 3, "currency" indicates currencies of cash stored in the cash handling apparatus 100, and "denomination" indicates denominations of each currency. "Minimum quantity" is one of replenishment conditions. When the cash in the cash handling apparatus 100 has decreased and reached the minimum quantity, it is determined that replenishment with cash is necessary. "Ideal quantity" indicates the quantity of cash desired to be stored in the cash handling apparatus 100. For example, the quantity of cash required for dispensing a change, i.e., a change fund, is set as the ideal quantity. "Maximum quantity" is one of collection conditions. When the cash in the cash handling apparatus 100 has increased and reached the maximum quantity, it is determined that cash collection is necessary.

Figure 4:
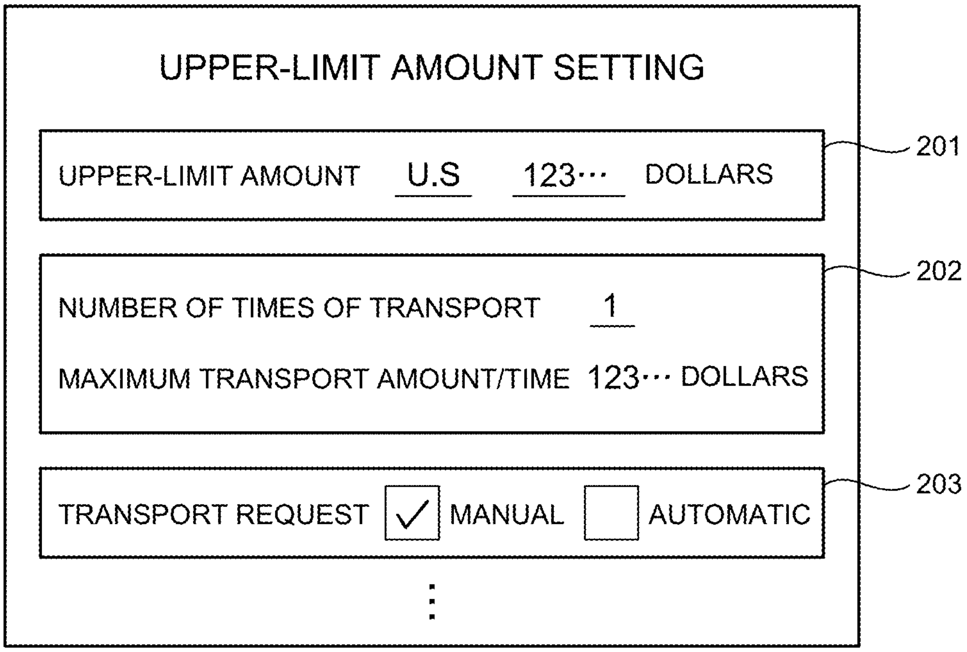
FIG. 4 shows an example of a screen for setting an upper-limit amount of cash to be transported by cash transport.

FIG. 4 shows an example of a screen for setting an upper-limit amount of cash that can be transported by cash transport. The store 20 or the head office 50 accesses the management device 10 and performs a predetermined operation through the communication terminal, whereby the setting screen shown in FIG. 4 is displayed on the screen of the communication terminal. In a frame 201 shown in FIG. 4, the store 20 or the head office 50 can specify a basic currency, and set an upper-limit amount of cash transport. For example, a first-country currency, which is a home currency, is selected and set as the basic currency. The upper-limit amount is set in an amount of the basic currency. The basic currency is not limited to the home currency, and a foreign currency may be set as the basic currency. For example, a foreign currency whose circulation is large in the area where the store is located may be set as the basic currency.

The number of times of cash transport can be set in a frame 202 shown in FIG. 4. For example, if the upper-limit amount is an amount not per cash transport but per day, the upper-limit amount to be used in each process regarding the cash to be transported is changed according to the number of times of cash transport. If the number of times of cash transport to be performed per day has been set to two times, such as before the start of business and after the end of business at the store 20, this number of times is inputted as the number of times of transport, and the maximum transport amount per cash transport is displayed within the frame 202. For example, when the upper-limit amount per day is 100,000 US dollars, if "2" is entered as the number of times of cash transport, the maximum transport amount is set to 50,000 US dollars for one cash transport. If the maximum transport amount is different from the upper-limit amount in FIG. 3, the management device 10 performs each process so that the total amount of cash to be transported in a single cash transport is equal to or less than the maximum transport amount. That is, the maximum transport amount is regarded as the upper-limit amount and each process is performed based on the maximum transport amount.

A frame 203 shown in FIG. 4 allows selection as to whether a request for cash transport is performed manually or automatically. When "automatic" is selected, the management device 10 determines whether or not cash transport is necessary, and the breakdown of cash to be transported, and performs the processes shown in FIG. 2. Thus, the store 20 and the head office 50 need not perform determination as to whether cash transport is necessary, and determination of the breakdown of the cash to be transported. The management device 10 determines execution of cash transport according to need, and the cash-in-transit company 30 performs cash transport determined by the management device 10, between the store 20 and the financial institution 40. However, even in the automatic mode, there is a case where the store 20 or the head office 50 needs to perform an operation to approve the cash transport or an operation to change the breakdown of the cash to be transported, as described with reference to FIG. 2.

Next, a method for determining a breakdown of cash to be transported will be described. Although there is a case where cash transport is performed for a plurality of cash handling apparatuses 100, the description will be continued for an exemplary case where one cash handling apparatus 100 is a target, for ease of description. When a plurality of cash handling apparatuses are targets, information on cash of the cash handling apparatus 100 described below may be replaced with pieces of information on cash of a plurality of apparatuses.

When "manual" is selected in the frame 203 on the screen shown in FIG. 4, the store 20 or the head office 50 can manually determine cash for which transport by the cash-in-transit company 30 is to be requested. Hereinafter, the description will be continued for an exemplary case where a clerk of the store 20 requests transport of banknotes.

Figure 5:
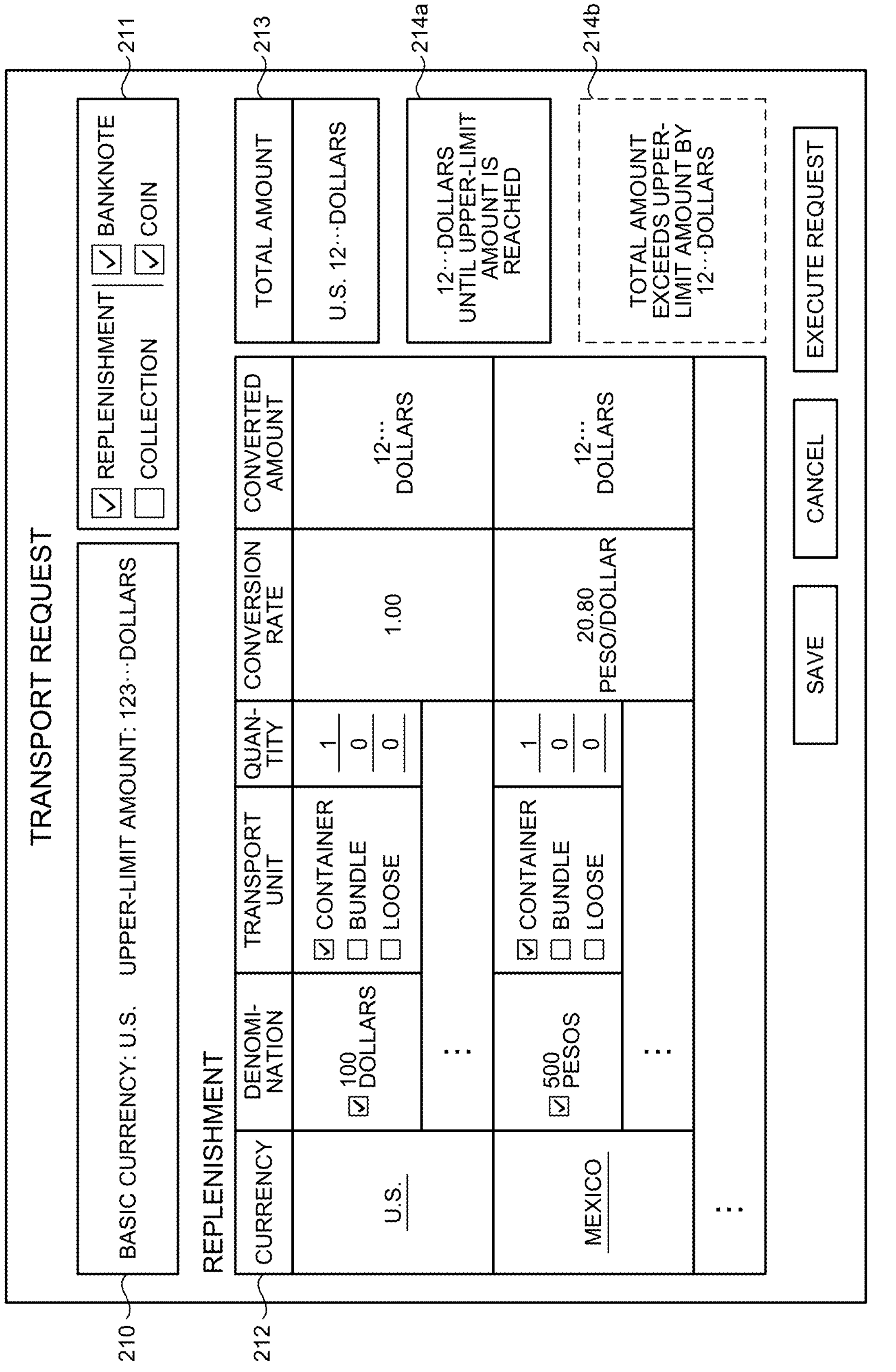
FIG. 5 shows an example of a screen for a case where cash, for which transport is to be requested, is manually determined.

FIG. 5 shows an example of a screen in a case where cash, for which transport is to be requested, is manually determined. The clerk accesses the management device 10 and performs a predetermined operation through the communication terminal, whereby the screen shown in FIG. 5 is displayed on the screen of the communication terminal. The basic currency and the upper-limit amount, which have been set in advance on the setting screen shown in FIG. 4, are displayed in a frame 210 on the screen. In a frame 211, the clerk can select at least one of "replenishment" for transporting cash from the financial institution 40 to the store 20, and "collection" for transporting cash from the store 20 to the financial institution 40. Also, in the frame 211, the clerk can select at least one of "banknote" and "coin" to request transport thereof.

The currencies and denominations which have been set in advance on the setting screen shown in FIG. 3, i.e., the currencies and denominations storable in the cash handling apparatus 100, are displayed in a frame 212. In the example shown in FIG. 5, since replenishment is selected in the frame 211, "replenishment" is displayed on the upper left of the frame 212. If collection is selected in the frame 211, a setting frame for "collection" is displayed instead of the frame 211. If both replenishment and collection are selected in the frame 211, a setting frame for "collection" is displayed in addition to the setting frame 212 for "replenishment". The clerk can select a currency and a denomination of cash, for which transport is to be requested, by checking a checkbox displayed on the left side of the corresponding denomination in the frame 212.

Although the currencies and the denominations in the frame 212 are automatically displayed, the clerk can change the currency and the denomination for which transport is to be requested. When the clerk performs an operation for selecting display of currencies such as "US" and "Mexico" displayed under the item "currency", a plurality of options for currencies are listed and displayed on the screen. The clerk can select a currency for which transport is to be requested, from among the listed currencies. In this case, under the item "denomination", denominations of the currency selected by the clerk are displayed. The clerk can select a denomination, for which transport is to be requested, by checking the checkbox corresponding to the denomination.

The clerk checks a checkbox on the left side of an option displayed under the item "transport unit" in the frame 212, and inputs a quantity on the right side of the selected transport unit and under the item "quantity", whereby the clerk can specify the quantity of cash of each denomination for which transport is to be requested.

In the example shown in FIG. 5, options of transport units include: a storage container ("container" in FIG. 5) in which a predetermined number of banknotes are stored; a bundle of banknotes ("bundle" in FIG. 5) obtained by binding a predetermined number of banknotes; and loose banknotes ("loose" in FIG. 5). For example, if the storage container is a storage bag that stores 150 banknotes, the clerk selects "container" and enters "1" for the quantity as shown in FIG. 5, whereby the clerk can request transport of one storage bag in which 150 banknotes are stored. That is, by selecting "container", the clerk can request transport of banknotes in a unit of 150 banknotes. Likewise, if the bundle of banknotes is a bundle of 100 banknotes, the clerk selects "bundle" and enters the number of bundles, whereby the clerk can request transport of banknotes in a unit of 100 banknotes, and receive the requested number of bundles of banknotes from the cash-in-transit company 30. Moreover, the clerk selects "loose" and enters the number of banknotes, whereby the clerk can request transport of banknotes in a unit of one banknote. Thus, the clerk specifies the transport unit and the quantity of each currency, thereby determining the breakdown of the cash for which transport by the cash-in-transit company 30 is to be requested.

The container is not limited to the storage bag in which a predetermined number of banknotes are stored. For example, the container may be a cassette type storage unit that is mountable/dismountable with respect to the cash handling apparatus 100. Furthermore, in selecting "container", not only the number of containers but also the number of banknotes to be stored in each container may be specified. The clerk may be able to specify the number of collection containers and the number of banknotes. For example, the clerk may specify “1” as the number of containers of the cassette type storage unit, and “1,000” as the number of banknotes to be stored in the container.

When the clerk has specified the denomination, the transport unit, and the quantity on the screen shown in FIG. 5, the total amount of specified cash of each currency is displayed under the item “converted amount” in the frame 212. The converted amount is obtained by the management device 100. The management device 10 calculates the total amount of cash of each currency specified by the clerk, and multiplies the total amount by a conversion rate to convert the total amount into an amount of the basic currency.

In the example shown in FIG. 5, since the basic currency is US currency and the conversion rate of US currency is “1.00”, the total amount of US currency to be transported is the converted amount as it is. Meanwhile, the total amount of Mexican currency (Mexican peso) to be transported is multiplied by a rate (conversion rate) between US currency and Mexican currency in order to calculate the amount (US dollar) converted from the amount of Mexican currency.

In a frame 213 on the screen shown in FIG. 5, the transport amount that is the total amount of cash specified by the clerk is displayed as the amount of the basic currency. Specifically, the management device 10 displays, in the frame 213, the amount obtained by summing up the converted amounts of the respective currencies in the frame 212.

A notification frame 214 (214*a*, 214*b*) is displayed on the screen based on a result of comparison between the transport amount and the upper-limit amount. In FIG. 5, the notification frame 214*a* is indicated by a solid line while the notification frame 214*b* is indicated by a broken line. This indicates that the notification frame 214*a* and the notification frame 214*b* are not simultaneously displayed, and one of them is displayed.

If the total amount of cash specified by the clerk does not reach the upper-limit amount, the management device 10 displays the notification frame 214*a* including a difference obtained by subtracting the total amount from the upper-limit amount. The clerk can increase cash for which transport is to be requested, while checking the difference in the notification frame 214*a*. Meanwhile, if the total amount of cash specified by the clerk exceeds the upper-limit amount, the management device 10 displays the notification frame 214*b* including a warning indicating this, and a difference obtained by subtracting the upper-limit amount from the total amount. The clerk checks the warning and the difference in the notification frame 214*b*, and decreases the cash for which transport is to be requested so that the transport amount becomes equal to or less than the upper-limit amount.

As shown in FIG. 5, buttons for “save”, “cancel”, and “execute request” are displayed on a lower part of the screen. If the clerk presses the “cancel” button, a request for transport is not performed to the cash-in-transit company 30. If the clerk presses the “execute request” button, cash transport is requested to the cash-in-transit company 30, with the content specified by the clerk on the screen. Specifically, the management device 10 notifies the cash-in-transit company 30 of the content specified by the clerk on the screen, and the cash-in-transit company 30, which has received the notification, performs the cash transport based on the specification by the clerk.

If the clerk presses the “save” button, a request to the cash-in-transit company 30 is not performed, and the content specified by the clerk on the screen is stored in the management device 10. In the cash transport system 1, it is also possible to automatically perform a request to the cash-in-transit company 30 with the content stored by the clerk. If the clerk stores the specified content of the cash transport and performs a predetermined operation for specifying a timing to request the cash-in-transit company 30 for cash transport with the specified content, the management device 10 transmits the stored, specified content to the cash handling apparatus 100 at the specified timing, and requests the cash-in-transit company 30 to perform the cash transport. For example, if the clerk specifies a day of the week and time, the management device 10 automatically requests the cash-in-transit company 30 for cash transport at the specified time on the specified day of the week.

Figure 6:
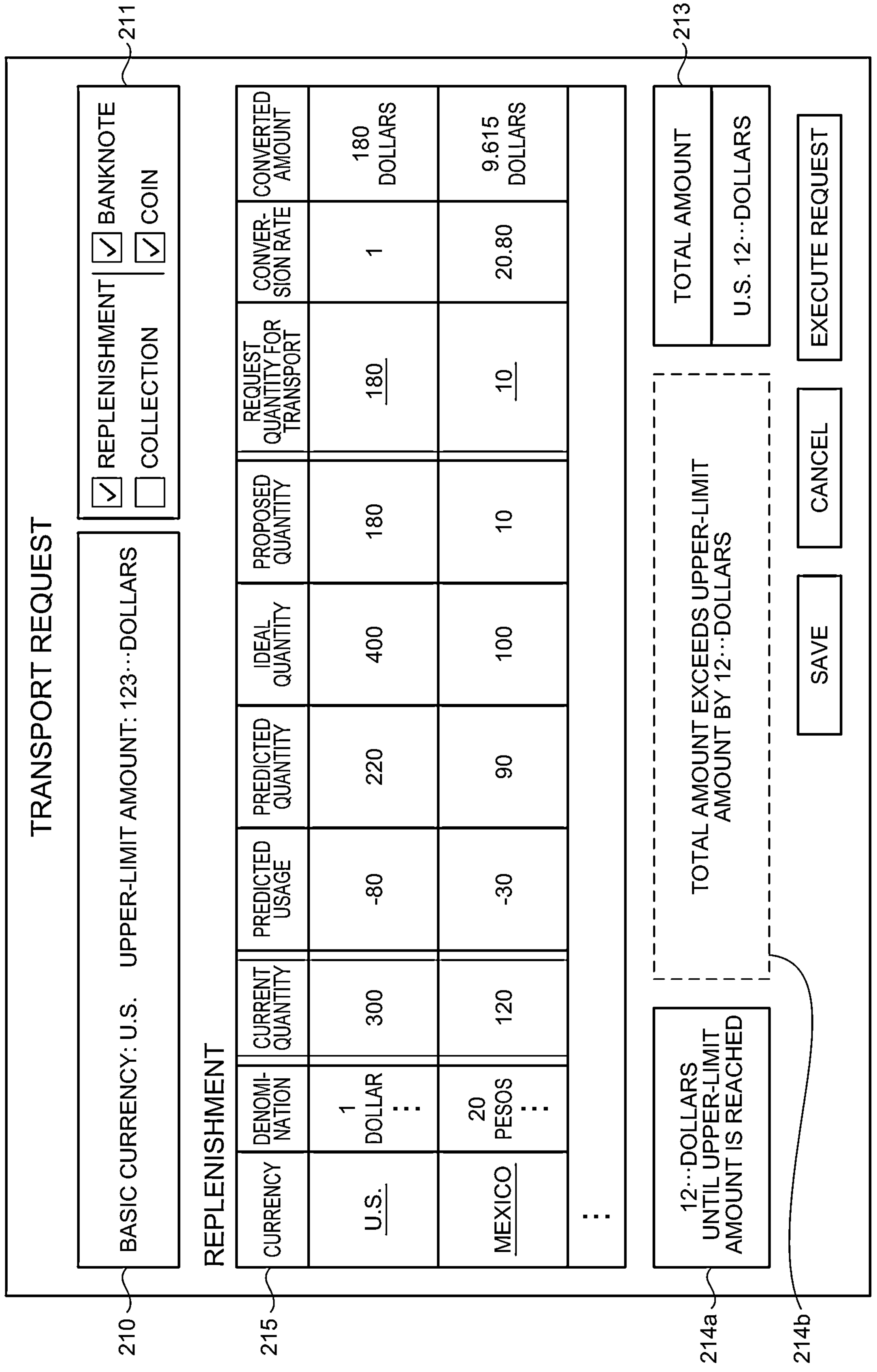
FIG. 6 shows an example of another screen for a case where cash, for which transport is to be requested, is manually determined.

FIG. 6 shows an example of another screen for manually setting cash for which transport is to be requested. The clerk of the store 20 accesses the management device 10 and performs a predetermined operation through the communication terminal, whereby a setting screen shown in FIG. 6 is displayed on the screen of the communication terminal. The clerk can select either the screen shown in FIG. 5 or the screen shown in FIG. 6, and specify a breakdown of cash, for which transport is to be requested, on the selected screen.

In the screen shown in FIG. 6, a frame 215 for specifying cash to be transported is different from the frame 212 on the screen shown in FIG. 5. Since FIG. 6 is identical to FIG. 5 except for the frame 215, a method for specifying cash to be transported by using information in the frame 215 will be described.

In addition to “currency”, “denomination”, “conversion rate”, and “converted amount” shown in FIG. 5, items of “current quantity”, “predicted usage”, “predicted quantity”, “ideal quantity”, “proposed quantity”, and “request quantity for transport” are displayed in the frame 215. The current quantity indicates the quantity of cash currently stored in the cash handling apparatus 100.

The predicted usage indicates a change in the amount of cash within a predetermined period, which is predicted by the management device 10 from transition in the past inventory amount of cash in the cash handling apparatus 100. For example, the management device 10 analyzes the transition in the past inventory amount of cash in the cash handling apparatus 100, predicts how much cash of each denomination will decrease or increase before the store 20 closes, and displays the predicted amount under the item “predicted usage”. A negative value of the predicted usage indicates that cash will decrease, and a positive value of the predicted usage indicates that cash will increase. Prediction of the amount of change in cash may be performed using well-known techniques such as machine learning and statistical methods.

The predicted quantity is a value obtained by adding the quantity of the predicted usage to the current quantity. When the predicted usage is the predicted amount of a change in the amount of cash until the store 20 closes, the predicted quantity is the quantity of cash that is predicted to remain in the cash handling apparatus 100 after the store 20 closes, when the store 20 continues business without performing cash replenishment and cash collection.

The ideal quantity corresponds to the value set on the setting screen shown in FIG. 3, and indicates the quantity of cash that is desired to be stored in the cash handling apparatus 100. For example, the quantity of a change fund is set as the ideal quantity. The proposed quantity is the quantity of cash to be transported, which is proposed to the clerk by the management device 10. The proposed quantity is a difference between the ideal quantity and the predicted quantity. When the predicted usage is the predicted amount of a change in the amount of cash until the store 20 closes, the proposed quantity is the quantity of cash for which transport by the cash-in-transit company 30 needs to be requested in order to make the quantity of cash, which remains in the cash handling apparatus 100 after the store 20 closes, equal to the ideal quantity.

For example, the example shown in FIG. 6 indicates that 300 US 1-dollar notes are currently stored in the cash handling apparatus 100. The management device 10 predicts that the number of US 1-dollar notes will further decrease by 80 and become 220 before the store 20 closes, and proposes a request for transport of 180 US 1-dollar notes in order to make the number of US 1-dollar notes, after the store 20 closes, equal to the ideal quantity of 400. Likewise, regarding Mexican 20-peso notes, the management device 10, based on the prediction obtained from the transition in the past inventory amount of cash, proposes a request for transport of 10 Mexican 20-peso notes in order to achieve the ideal quantity at the end of business hours of the store 20.

If the predicted quantity exceeds the ideal quantity, the proposed quantity in replenishment is 0. For example, in the case of US 1-dollar notes described above, if the predicted quantity after the store 20 closes exceeds the ideal quantity of 400, the management device 10 sets the proposed quantity to 0 because replenishment with US 1-dollar notes is not necessary. In this case, the proposed quantity may be displayed on the screen for specifying cash for which collection is to be requested. For example, if the predicted quantity of US 1-dollar notes after the store 20 closes is 420, the proposed quantity for collection is 20 on the screen on which the clerk specifies cash for which collection is to be requested, so that the quantity after the store 20 closes becomes the ideal quantity of 400.

Under the item "request quantity for transport" in the frame 215 shown in FIG. 6, the number of banknotes as the proposed quantity is automatically entered, but the clerk can manually change the request quantity for transport. On the screen shown in FIG. 6, like the screen shown in FIG. 5, under the item "converted amount", an amount obtained by converting the total amount of each currency into an amount of the basic currency is displayed. The converted amount is calculated based on the currency, denomination, request quantity for transport, and conversion rate. In addition, an amount obtained by summing up the converted amounts of the respective currencies is displayed in the frame 213, and the notification frame 214*a* or 214*b* is displayed based on a result of comparison between the amount in the frame 213 and the upper-limit amount. The clerk can change the breakdown of the cash for which transport is to be requested, while checking the amount notified in the notification frame 214*a* or 214*b*.

In FIG. 5 and FIG. 6, cash with which the cash handling apparatus 100 is replenished is specified, that is, cash for which transport from the financial institution 400 to the store 20 is to be requested, is specified. Cash to be collected from the cash handling apparatus 100, that is, cash for which transport from the store 20 to the financial institution 400 is to be requested, is specified in the same way as that described above. In this case, when the clerk manually specifies the breakdown of the cash to be collected, on the setting screen, the total amount of cash to be transported by the cash-in-transit company 30, and information indicating whether or not this total amount exceeds the upper-limit amount, are displayed on that screen. The clerk can determine the breakdown of the cash for which transport by the cash-in-transit company 30 is to be requested, while checking the screen.

In a case where the number of times of transport is set to two or more on the setting screen shown in FIG. 4, the maximum transport amount is used as the upper-limit amount on the screens shown in FIG. 5 and FIG. 6. In this case, the management device 10 displays the notification frame 214*a* or 214*b*, based on a result of comparison between the total amount of cash specified by the clerk and the maximum transport amount.

Next, a method for automatically determining a breakdown of cash to be transported will be described. When "automatic" is selected in the frame 203 on the screen shown in FIG. 4, the management device 10 automatically determines whether or not cash transport is necessary and a breakdown of cash for which transport is to be requested. In this case, the management device 10 can use the information on the minimum quantity, the ideal quantity, and the maximum quantity that have been set on the screen shown in FIG. 3.

The description will be specifically given on the assumption that, for the cash handling apparatus 100, the minimum quantity, the ideal quantity, and the maximum quantity of US 20-dollar notes are set to 100, 150, and 200, respectively, and the minimum quantity, the ideal quantity, and the maximum quantity of Mexican 500-peso notes are set to 50, 100, and 150, respectively.

For example, if the number of US 20-dollar notes decreases and reaches 80 that is less than the minimum quantity of 100, the management device 10 determines that replenishment with cash is necessary. The management device 10 determines that 70 US 20-dollar notes (=150 (ideal quantity)−80 (current quantity)) are to be supplied so as to make the number of US 20-dollar notes equal to the ideal quantity of 150. At this time, the management device 10 may include another currency and/or another denomination into the cash for replenishment. For example, if the number of Mexican 500-peso notes currently stored in the cash handling apparatus 100 is 90, this number exceeds the minimum quantity of 50 set for indicating that replenishment is necessary. However, the management device 10 includes 10 Mexican 500-peso notes (=100 (ideal quantity)−90 (current quantity)) into the cash for replenishment, so that the number of banknotes becomes the ideal quantity of 100. Likewise, as for the other denominations of US currency and the other denominations of Mexican currency, the management device 10 determines a breakdown of cash for replenishment so that the quantity of cash of each denomination becomes the ideal quantity. The management device 10 can perform the processes in step S2 and subsequent steps shown in FIG. 2 on the breakdown of cash determined as described above. Thus, when transport of cash of one denomination is required, cash of another denomination is included in the cash to be transported, whereby the number of times of cash transport can be reduced.

For example, if the number of US 20-dollar notes increases and reaches 210 that is larger than the maximum quantity of 200, the management device 10 determines that collection of cash is necessary. The management device 10 determines that 60 US 20-dollar notes (=210 (current quantity)−150 (ideal quantity)) are to be collected so as to make the number of US 20-dollar notes equal to the ideal quantity of 150. At this time, the management device 10 may include another currency and/or another denomination into the cash to be collected. For example, if the number of Mexican 500-peso notes currently stored in the cash handling apparatus 100 is 130, this number does not exceed the maximum quantity of 150 set for indicating that collection is necessary. However, the management device 10 includes 30 Mexican 500-peso notes (=130 (current quantity)−100 (ideal quantity)) into the cash to be collected so that the number of banknotes becomes the ideal quantity of 100. Likewise, as for the other denominations of US currency and the other denominations of Mexican currency, the management device 10 determines a breakdown of cash to be collected so that the quantity of cash of each denomination becomes the ideal quantity. The management device 10 can perform the processes in step S2 and subsequent steps shown in FIG. 2 on the breakdown of cash determined as described above.

The management device 10 may automatically determine cash to be transported, by using the proposed quantity based on the predicted usage. In this case, the management device 10 may determine a breakdown of cash to be transported, by setting the proposed quantity, which has been calculated as described with reference to FIG. 6, to the transport quantity for each currency and each denomination, and perform the processes in step S2 and subsequent steps shown in FIG. 2.

In the description of the warning process shown in FIG. 2, if the transport amount exceeds the upper-limit amount, the breakdown of the cash to be transported is manually changed. However, the management device 10 may automatically change the breakdown. For example, after the cash to be transported is manually or automatically determined, the management device 10 may exclude, from the cash to be transported, denominations one by one from a denomination having the smallest difference between the current quantity and the ideal quantity, until the total amount of cash to be transported becomes equal to or less than the upper-limit amount. For another example, when cash is to be collected from the store 20, denominations may be excluded, from the cash to be transported, one by one from a denomination having the smallest increase rate of the inventory amount during a predetermined period, based on the transition in the past inventory amount of cash of each currency and each denomination. When the store 20 is to be replenished with cash, denominations may be excluded, from the cash to be transported, one by one from a denomination having the smallest decrease rate of the inventory amount during a predetermined period. That is, in the cash transport for collecting cash, cash whose inventory amount is not likely to increase may be preferentially excluded from the cash to be transported. In the cash transport for replenishment with cash, cash whose inventory amount is not likely to decrease may be preferentially excluded from the cash to be transported. At this time, the management device 10 may preferentially exclude a currency different from the basic currency, from the cash to be transported.

In the description of the notification process shown in FIG. 2, when the transport amount is less than the upper-limit amount, the breakdown of the cash to be transported is manually changed. However, the management device 10 may automatically change the breakdown. For example, after the cash to be transported is manually or automatically determined, the management device 10 may increase the transport quantity by a predetermined quantity each time, from a denomination having the largest difference between the current quantity and the ideal quantity so that the total amount of the cash to be transported does not exceed the upper-limit amount. For another example, when cash is to be collected from the store 20, the transport quantity may be increased by a predetermined quantity for each denomination, from a denomination having the largest increase rate of the inventory amount during a predetermined period, based on the transition in the past inventory amount of cash of each currency and each denomination. When the store 20 is to be replenished with cash, the transport quantity may be increased by a predetermined quantity for each denomination, from a denomination having the largest decrease rate of the inventory amount during a predetermined period. That is, in the cash transport for collecting cash, cash whose inventory amount is likely to increase may be preferentially increased in the transport quantity. In the cash transport for replenishment with cash, cash whose inventory amount is likely to decrease may be preferentially increased in transport quantity. In this case, the management device 10 may preferentially increase the transport quantity of cash of the basic currency.

In FIG. 3, setting of quantity is performed on a single cash handling apparatus 100. However, setting of quantity may be performed at each of installation places of cash handling apparatuses 100. For example, if the store 20 includes a plurality of departments for foodstuffs, daily necessities, etc., and a plurality of cash handling apparatuses are used in each department, the clerk can set the quantity of cash for each department, with the screen shown in FIG. 3. For another example, if the store 20 includes second and higher floors, the clerk can set the quantity of cash for each floor, with the screen shown in FIG. 3. In these cases, information on each installation place such as a department or a floor is displayed on the screen, and the clerk sets the quantity of cash at each installation place. When the quantity of cash is set for each installation place, the quantities of cash stored in a plurality of cash handling apparatuses installed in each installation place are summed up, followed by determination as to whether cash transport is necessary, determination of a breakdown of cash to be transported, comparison with the upper-limit amount, and the like. For example, on the screen shown in FIG. 5 and FIG. 6, the frames 212, 215 for specifying cash to be transported are displayed for each installation place, and information on cash in all the cash handling apparatuses existing in the installation place is displayed in the frames. The clerk can specify the breakdown of the cash to be transported for each installation place. In addition, for example, the management device 10 performs, for each installation place, the process for determining whether or not cash transport is necessary, and the process for automatically determining the breakdown of the cash to be transported. However, since comparison between the transport amount and the upper-limit amount is performed using the total amount obtained by summing up the cash to be transported for the respective installation places, even when cash transport is performed for a plurality of installation places, a breakdown of the cash to be transported is determined so that the transport amount between the store 20 and the financial institution 40 does not exceed the upper-limit amount.

Next, cash transport performed for a plurality of stores will be described. When the head office 50 sets an upper-limit amount of cash to be transported in a single cash transport to be performed for a plurality of stores that belong to its own company, the management device 10 manages the transport amount for each store so that the transport amount of the single cash transport performed for the plurality of stores does not exceed the upper-limit amount. Although the number of stores is not limited, the description will be given of a case where two stores, a store A and a store B, belong to the head office 50.

Figure 7:
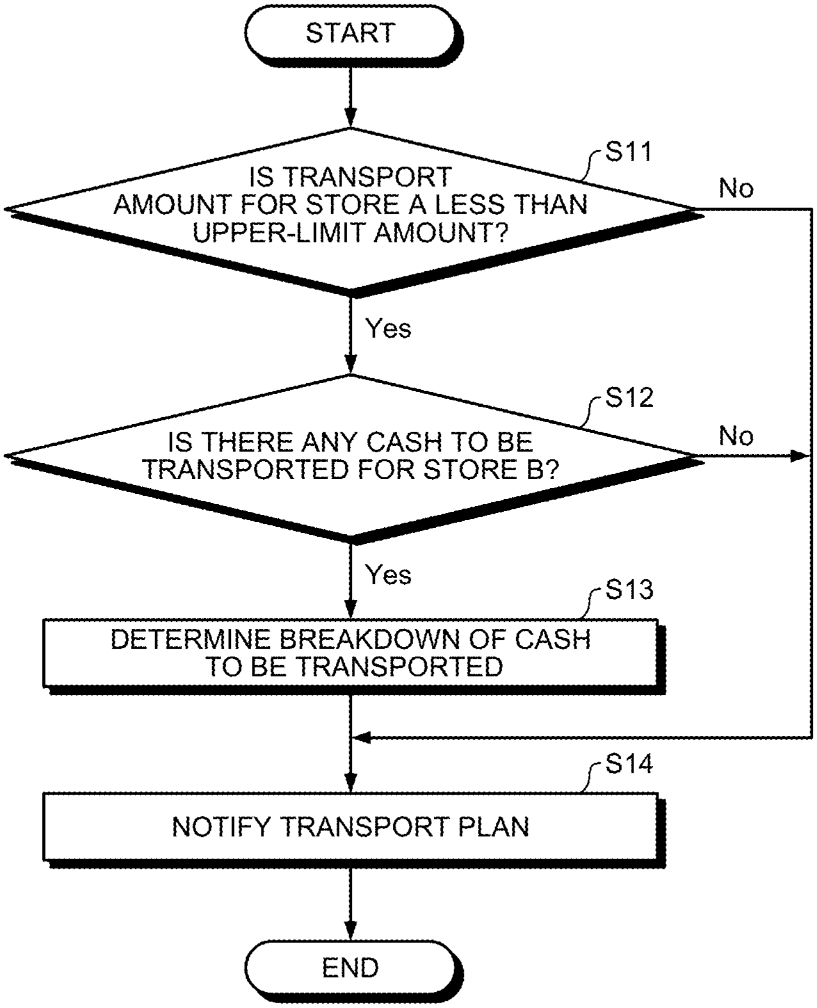
FIG. 7 is a flowchart showing a flow of processing that the management device performs for a plurality of stores.

FIG. 7 is a flowchart showing a flow of processing that the management device 10 performs for the plurality of stores. The management device 10 determines whether or not the transport amount of cash transport to be performed for the store A is less than the upper-limit amount (step S11). When the transport amount is less than the upper-limit amount (step S11; Yes), the management device 10 determines whether or not there is cash to be transported for the store B (step S12). When there is cash that can be transported for the store B (step S12; Yes), the management device 10 determines cash to be transported for the store B. Thus, the breakdown of the cash to be transported for the store A and the store B are determined (step S13). The management device 10 performs a notification process for a cash transport plan to be performed for the store A and the store B (step S14). On the other hand, when the transport amount of cash transport to be performed for the store A is the upper-limit amount or more (step S11; No), or when the transport amount is less than the upper-limit amount (step S11; Yes) but there is no cash to be transported for the store B (step S12; No), the management device 10 performs a transport plan notification process with the target of cash transport being the store A only (step S14). Although not shown in FIG. 7, when the transport amount of cash transport to be performed for the store A exceeds the upper-limit amount, approval of the cash transport or change in the breakdown of the cash to be transported so as not to exceed the upper-limit amount is performed as described above.

Figure 8:
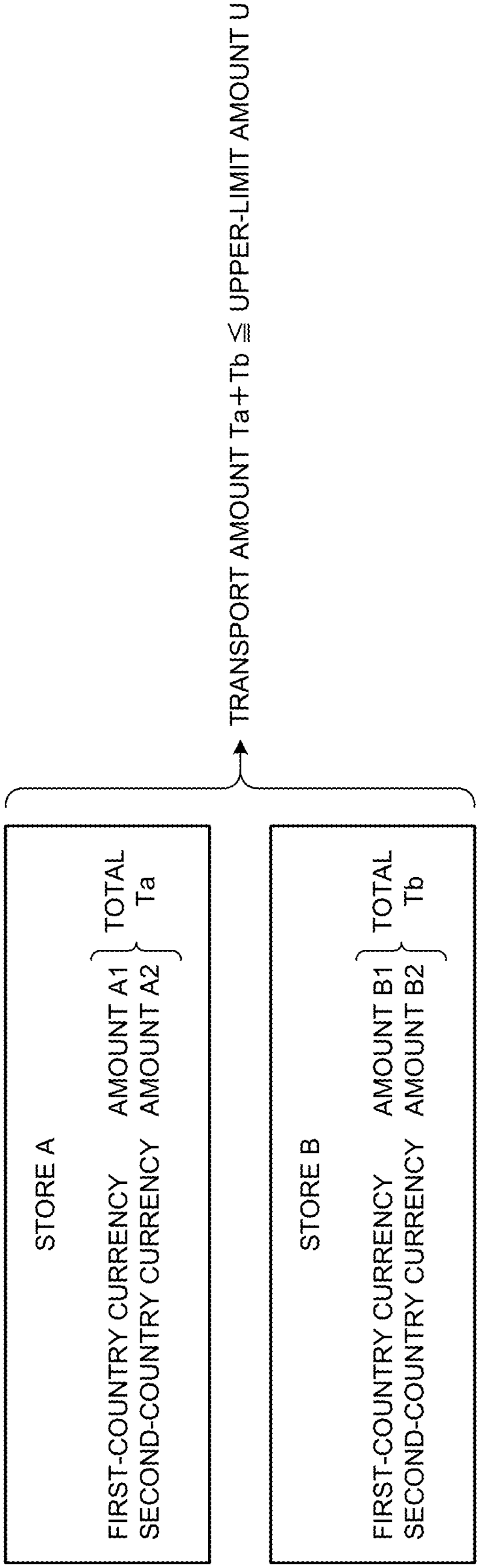
FIG. 8 is a schematic diagram illustrating a method for determining breakdowns of cash to be transported for a plurality of stores.

FIG. 8 is a schematic diagram illustrating a method for determining breakdowns of cash to be transported for a plurality of stores. It is assumed that, in the store A, a breakdown of cash to be transported is determined manually or automatically by the management device 10, and the amount of cash of the first-country currency to be transported is A1, the amount obtained by converting the amount of cash of the second-country currency into the first-country currency is A2, and the total amount is Ta (=A1+A2).

In cash transport for collecting cash from the store A, if the total amount Ta of cash to be collected from the store A is less than an upper-limit amount U, the management device 10 determines whether or not there is cash collectable from the store B. For example, when a currency and a denomination, whose quantity of cash in the cash handling apparatus exceeds the ideal quantity, are present in the cash handling apparatus of the store B, the management device 10 determines that there is cash collectable from the store B.

The management device 10 determines cash of the first-country currency and cash of the second-country currency to be collected from the store B so that a total amount Tb of an amount B1 of the first-country currency to be collected from the store B and an amount B2 obtained by converting the amount of the second-country currency into the first-country currency becomes equal to or less than an amount obtained by subtracting the amount Ta from the upper-limit amount U. In other words, as shown in FIG. 8, the management device 10 determines the breakdowns B1 and B2 of the cash of the first-country currency and the cash of the second-country currency to be collected from the store B so that the total amount of the amount Ta of cash to be collected from the store A and the amount Tb of cash to be collected from the store B is equal to or less than the upper-limit amount U.

For example, the management device 10 provisionally determines, as cash to be collected, a quantity of cash exceeding the ideal quantity, of each currency and each denomination of cash stored in the cash handling apparatus of the store B, and calculates the total amount Tb of cash to be collected. As described with reference to FIG. 6, the proposed quantity, which is obtained from the predicted usage based on the transition in the past inventory amount of cash, may be provisionally determined as cash to be collected. If an amount obtained by adding the total amount Tb of provisionally determined cash to the amount Ta of cash collected from the store A does not exceed the upper-limit amount U, the management device 10 determines all the provisionally determined cash, as cash to be collected from the store B.

On the other hand, if the total of the amount Ta and the provisionally determined amount Tb exceeds the upper-limit amount U, the management device 10 adjusts the cash to be collected from the store B, as described above. For example, the management device 10 excludes, from the cash to be collected from the store B, denominations one by one from a denomination whose storage quantity in the cash handling apparatus is closest to the ideal quantity in the store B, until the total amount of the amount Ta and the amount Tb becomes equal to or less than the upper-limit amount. At this time, the management device 10 may preferentially exclude a currency that is not the basic currency from the cash to be collected from the store B.

In cash transport for delivering cash to the store A, if the total amount Ta of cash to be delivered to the store A is less than the upper-limit amount U, the management device 10 determines whether or not there is deliverable cash to the store B. For example, if a currency and a denomination, whose quantity of cash in the cash handling apparatus is less than the ideal quantity, are present in the cash handling apparatus of the store B, the management device 10 determines that there is cash deliverable to the store B.

The management device 10 determines cash of the first-country currency and cash of the second-country currency to be delivered to the store B so that the total amount Tb of the amount B1 of the first-country currency to be delivered to the store B and the amount B2 obtained by converting the amount of the second-country currency into the first-country currency, is equal to or less than an amount obtained by subtracting the amount Ta from the upper-limit amount U. In other words, as shown in FIG. 8, the management device 10 determines the breakdowns B1 and B2 of the cash to be delivered to the store B so that the total amount of the amount Ta of the cash to be delivered to the store A and the amount Tb of the cash to be delivered to the store B becomes equal to or less than the upper-limit amount U.

For example, the management device 10 provisionally determines, as cash to be delivered, a quantity of cash obtained by subtracting the quantity of cash of each currency and each denomination, which is stored in the cash handling apparatus of the store B and whose current quantity is less than the ideal quantity, from the ideal quantity, and calculates a total amount Tb of cash for replenishment. As described with reference to FIG. 6, the management device 10 may provisionally determine, as cash to be delivered, the proposed quantity of cash obtained from the predicted usage based on the transition in the past inventory amount of cash. If an amount obtained by adding the total amount Tb of provisionally determined cash to the delivery amount Ta to the store A does not exceed the upper-limit amount U, the management device 10 determines all the provisionally determined cash as cash to be delivered to the store B.

On the other hand, if the total of the amount Ta and the provisionally determined amount Tb exceeds the upper-limit amount U, the management device 10 adjusts the cash to be delivered to the store B, as described above. For example, the management device 10 excludes, from the cash to be delivered to the store B, denominations one by one from a denomination whose storage quantity in the cash handling apparatus is closest to the ideal quantity in the store B, until the total amount of the amount Ta and the amount Tb becomes equal to or less than the upper-limit amount. At this time, the management device 10 may preferentially exclude the second-country currency that is not the basic currency from the cash to be delivered to the store B.

When the breakdowns of the cash to be delivered to the store A and the store B have been determined as described above, the management device 10 performs the notification process, and the respective processes and responses are progressed in the same manner as that for the case where the transport target is a single store 20. Cash information to be notified in this case includes the denominations and the quantity for each denomination of the first-country currency and the second-country currency to be transported for the store A, and the denominations and the quantity of each denomination of the first-country currency and the second-country currency to be transported for the store B.

Determination for cash to be transported for the store B may be manually performed. For example, the management device 10, which has recognized that the amount Ta of cash to be transported for the store A is less than the upper-limit amount U, may notify the store B to determine cash to be transported, and the store B may manually determine the cash to be transported as described with reference to FIG. 5 and FIG. 6. The management device 10 may perform such a notification to the head office 50, and the head office 50 may manually determine cash to be transported for the store B. In these cases, on the screens shown in FIG. 5 and FIG. 6, the notification frame 214*a* or 214*b* is displayed such that the amount obtained by subtracting the amount Ta from the upper-limit amount U is regarded as the upper-limit amount of cash to be transported for the store B. This allows the store B or the head office 50 to determine the breakdown of the cash to be transported for the store B so that the total amount of the transport amount Ta for the store A and the transport amount Tb for the store B does not exceed the upper-limit amount U.

The management device 10 may adjust the breakdown of the cash to be transported for the store A and the cash to be transported for the store B, based on the transition in the past inventory amount in each store. For example, in the case of collecting cash, a store in which the inventory amount increase rate within a predetermined period is high may be given priority, and the breakdown may be adjusted such that the total amount of cash to be collected from this store is larger than the total amount of cash to be collected from the other store. That is, cash may be collected preferentially from the store in which the inventory amount of cash is likely to increase. For another example, in the case of replenishment with cash, a store in which the inventory amount decrease rate within a predetermined period is high may be given priority, and the breakdown may be adjusted such that the total amount of cash with which the store is replenished is larger than the total amount of cash with which the other store is replenished. That is, the store in which the inventory amount of cash is likely to decrease may be preferentially replenished with cash. For example, a ratio of transport amounts for the respective stores may be firstly determined based on the change rate of the past inventory amount in each store, and then the breakdown of cash to be transported for each store may be determined as described above.

Although the present embodiment has been mainly described using banknotes as an example, the above-described processes can be performed for coins as well in the cash transport system 1. In addition, regarding the processes described using two currencies, i.e., the first-country currency and the second-country currency, even if the cash handling apparatus handles three or more currencies, the above-described processes can be performed for each currency. Moreover, regarding the processes described using two stores, i.e., the store A and the store B, even if there are three or more stores, the above-described processes can be performed for each store.

In the present embodiment, various processes that can be performed by the management device 10 are described. However, the management device 10 may not necessarily perform all the processes, and may perform some of the processes. For example, the case where determination for necessity of cash transport and determination for breakdown of cash to be transported are manually performed with the management device 10 and the case where these determinations are automatically performed by the management device 10, are described; however, the determinations may be performed manually or automatically. Regarding the above-described plurality of processes related to cash to be transported, only a part of the processes may be performed among the plurality of processes.

A cash transport system according to the present disclosure includes: one or more cash handling apparatuses that are installed in a store and are configured to handle a plurality of currencies of cash; and a management device configured to determine whether or not cash transport to the store for replenishing the cash handling apparatus with cash is necessary, and whether or not cash transport from the store for collecting cash from the cash handling apparatus is necessary. Upon determining that the cash transport is necessary, the management device calculates, based on one currency selected in advance from among the plurality of currencies, a transport amount by converting the amounts of cash of currencies, which are to be transported, into amounts of the selected currency, and summing up the converted amounts. When the transport amount exceeds a predetermined upper-limit amount, the management device performs a notification to a predetermined communication terminal.

In the above configuration, when the transport amount does not exceed the upper-limit amount, the management device may transmit a notification for requesting the cash transport to a cash-in-transit company that performs the cash transport.

In the above configuration, when cash transport for each store is performed through a plurality of stores, the management device may calculate a transport amount by converting the amounts of cash, which are to be transported by cash transport for the respective stores, into amounts of the selected currency, and summing up the converted amounts. When the transport amount exceeds the upper-limit amount, the management device may perform a notification to a predetermined communication terminal.

In the above configuration, when the transport amount exceeds the upper-limit amount, if the cash transport is transport of cash to be collected from a cash handling apparatus, the management device compares storage quantities of cash for each currency and each denomination in the cash handling apparatus, and excludes, from a transport target, one or more denominations in order from a denomination whose storage quantity is the smallest, thereby adjusting the transport amount to the upper-limit amount or less. If the cash transport is transport of cash with which a cash handling apparatus is replenished, the management device compares storage quantities of cash of each currency and each denomination in the cash handling apparatus, and excludes, from the transport target, one or more denominations in order from a denomination whose storage quantity is the largest, thereby adjusting the transport amount to the upper-limit amount or less.

In the above configuration, when the transport amount exceeds the upper-limit amount, the management device may exclude, from the transport target, at least a part of cash other than the selected currency, thereby adjusting the transport amount to the upper-limit amount or less.

In the above configuration, when the transport amount is less than the upper-limit amount, the management device may add cash to be transported by the cash transport within a range where the total amount of cash to be transported does not exceed the upper-limit amount.

In the above configuration, when the cash transport is transport of cash to be collected from a cash handling apparatus, the management device may notify the cash handling apparatus of types and a quantity for each type of the cash to be collected, and the cash handling apparatus may move, from a storage unit to a collection container, cash to be collected among cash stored in the storage unit in the apparatus.

In the above configuration, the management device may notify an external device that performs account handling for a financial institution, of an amount of cash to be transported between the store and the financial institution, and the external device may perform the account handling based on the information notified from the management device.

Advantageous Effects

The cash transport system according to the present disclosure can flexibly cope with various cash transport methods. For example, when cash transport for a plurality of types of currencies is performed, a total amount of cash to be transported is calculated by converting an amount of each currency into an amount of a predetermined currency, and work related to cash transport can be supported so that this amount becomes equal to or less than a predetermined upper-limit The components of the cash transport system 1 according to the present embodiment are conceptually functional components, and thus may not necessarily be physically limited thereto. For example, the management device 10 may implement a part or the entirety of the function and operation of the cash handling apparatus 100. The cash handling apparatus 100 may implement a part or the entirety of the function and operation of the management device 10. Distributed or integrated forms of each device are not limited to the forms described above, and all or some of the forms may be distributed or integrated functionally or physically in any unit depending on various loads, use statuses, or the like.

As described above, according to the cash transport system, once an upper-limit amount is set in an amount of a predetermined currency, the management device automatically determines a breakdown of cash to be transported by cash transport so that the amount of cash to be transported from a store and the amount of cash to be transported to the store are equal to or less than the upper-limit amount, respectively. The breakdown of cash can be manually determined by the user of the cash transport system in addition to the automatic determination. In the manual determination, the management device supports the determination work. This reduces the store's workload related to cash transport.

What is claimed is:

1. A cash transport system, comprising:

one or more cash handling apparatuses that are installed in a store and are configured to handle a plurality of currencies of cash; and a management device including circuitry configured to determine whether cash transport to the store for replenishing the cash handling apparatus with cash is necessary;

determine whether cash transport from the store for collecting cash from the cash handling apparatus is necessary;

in a case that the circuitry has determined that any of the cash transport to the store and the cash transport from the store is necessary, calculate, based on one currency selected in advance from among the plurality of currencies, a transport amount by converting the amounts of cash of currencies to be transported into amounts of the selected currency and summing up the converted amounts; and in a case that the transport amount exceeds a upper-limit amount, notify a communication terminal that the transport amount exceeds the upper-limit amount.

2. The cash transport system according to claim 1, wherein the circuitry is further configured to, in a case that the transport amount does not exceed the upper-limit amount, transmits a notification for requesting the cash transport to a cash-in-transit company that performs the cash transport.

3. The cash transport system according to claim 1, wherein the circuitry is further configured to in a case that the cash transport for each store is performed through a plurality of stores, calculate the transport amount by converting the amounts of cash to be transported by the cash transport for the respective stores into amounts of the selected currency, and summing up the converted amounts, and in the case that the transport amount exceeds the upper-limit amount, notifies the communication terminal.

4. The cash transport system according to claim 1, wherein the circuitry is further configured to, in the case that the transport amount exceeds the upper-limit amount, in a case that the cash transport is transport of cash to be collected from the cash handling apparatus, compare storage quantities of cash for each currency and each denomination in the cash handling apparatus, and exclude, from a target of the cash transport, one or more denominations in order from a denomination smallest in the storage quantity, thereby adjusting the transport amount to the upper-limit amount or less, and in a case that the cash transport is transport of cash with which a cash handling apparatus is replenished, compare storage quantities of cash of each currency and each denomination in the cash handling apparatus, and exclude, from a target of the cash transport, one or more denominations in order from a denomination largest in the storage quantity, thereby adjusting the transport amount to the upper-limit amount or less.

5. The cash transport system according to claim 1, wherein the circuitry is further configured to, in the case that the transport amount exceeds the upper-limit amount, exclude, from a target of the cash transport, at least a part of cash other than the selected currency, thereby adjusting the transport amount to the upper-limit amount or less.

6. The cash transport system according to claim 1, wherein the circuitry is further configured to, in a case that the transport amount is less than the upper-limit amount, add cash to be transported by the cash transport within a range where the total amount of cash to be transported does not exceed the upper-limit amount.

7. The cash transport system according to claim 1, wherein in a case that the cash transport is transport of cash to be collected from the cash handling apparatus,
- the circuitry is configured to notify the cash handling apparatus of types and a quantity for each type of the cash to be collected, and
- the cash handling apparatus moves, from a storage to a collection container, cash to be collected among cash stored in the storage.

8. The cash transport system according to claim 1, wherein
- the circuitry notifies an external device, that performs account handling for a financial institution, of an amount of cash to be transported between the store and the financial institution, and
- the external device performs the account handling based on the information notified from the management device.

9. A management device, comprising:
circuitry configured to
- determine whether cash transport to the store for replenishing a cash handling apparatus with cash is necessary, the cash handling apparatus installed in a store and configured to handle a plurality of currencies of cash;
- determine whether cash transport from the store for collecting cash from the cash handling apparatus is necessary;
- in a case that the circuitry has determined that any of the cash transport to the store and the cash transport from the store is necessary, calculate, based on one currency selected in advance from among the plurality of currencies, a transport amount by converting the amounts of cash of currencies to be transported into amounts of the selected currency and summing up the converted amounts; and
- in a case that the transport amount exceeds a upper-limit amount, notify a communication terminal that the transport amount exceeds the upper-limit amount.

10. The management device according to claim 9, wherein the circuitry is further configured to, in a case that the transport amount does not exceed the upper-limit amount, transmits a notification for requesting the cash transport to a cash-in-transit company that performs the cash transport.

11. The management device according to claim 9, wherein the circuitry is further configured to
- in a case that the cash transport for each store is performed through a plurality of stores, calculate the transport amount by converting the amounts of cash to be transported by the cash transport for the respective stores into amounts of the selected currency, and summing up the converted amounts, and
- in the case that the transport amount exceeds the upper-limit amount, notifies the communication terminal.

12. The management device according to claim 9, wherein the circuitry is further configured to, in the case that the transport amount exceeds the upper-limit amount,
- in a case that the cash transport is transport of cash to be collected from the cash handling apparatus,
  - compare storage quantities of cash for each currency and each denomination in the cash handling apparatus, and
  - exclude, from a target of the cash transport, one or more denominations in order from a denomination smallest in the storage quantity, thereby adjusting the transport amount to the upper-limit amount or less, and
- in a case that the cash transport is transport of cash with which a cash handling apparatus is replenished,
  - compare storage quantities of cash of each currency and each denomination in the cash handling apparatus, and
  - exclude, from a target of the cash transport, one or more denominations in order from a denomination largest in the storage quantity, thereby adjusting the transport amount to the upper-limit amount or less.

13. The management device according to claim 9, wherein the circuitry is further configured to, in the case that the transport amount exceeds the upper-limit amount, exclude, from a target of the cash transport, at least a part of cash other than the selected currency, thereby adjusting the transport amount to the upper-limit amount or less.

14. The management device according to claim 9, wherein the circuitry is further configured to, in a case that the transport amount is less than the upper-limit amount, add cash to be transported by the cash transport within a range where the total amount of cash to be transported does not exceed the upper-limit amount.

15. The management device according to claim 9, wherein in a case that the cash transport is transport of cash to be collected from the cash handling apparatus,
- the circuitry is configured to notify the cash handling apparatus of types and a quantity for each type of the cash to be collected, and
- the cash handling apparatus moves, from a storage to a collection container, cash to be collected among cash stored in the storage.

16. The management device according to claim 9, wherein
- the circuitry notifies an external device, that performs account handling for a financial institution, of an amount of cash to be transported between the store and the financial institution, and
- the external device performs the account handling based on the information notified from the management device.

17. A management method, comprising:
- determining, by a management device, whether cash transport to the store for replenishing a cash handling apparatus with cash is necessary, the cash handling apparatus installed in a store and configured to handle a plurality of currencies of cash;
- determining whether cash transport from the store for collecting cash from the cash handling apparatus is necessary;
- in a case that the circuitry has determined that any of the cash transport to the store and the cash transport from the store is necessary, calculating, based on one currency selected in advance from among the plurality of currencies, a transport amount by converting the amounts of cash of currencies to be transported into amounts of the selected currency and summing up the converted amounts; and
- in a case that the transport amount exceeds a upper-limit amount, notifying a communication terminal that the transport amount exceeds the upper-limit amount.

18. The management method according to claim 17, further comprising:

in a case that the transport amount does not exceed the upper-limit amount, transmitting a notification for requesting the cash transport to a cash-in-transit company that performs the cash transport.

19. The management method according to claim 17, further comprising:

in a case that the cash transport for each store is performed through a plurality of stores, calculating the transport amount by converting the amounts of cash to be transported by the cash transport for the respective stores into amounts of the selected currency, and summing up the converted amounts, and in the case that the transport amount exceeds the upper-limit amount, notifying the communication terminal.

20. The management method according to claim 17, further comprising, in the case that the transport amount exceeds the upper-limit amount:

in a case that the cash transport is transport of cash to be collected from the cash handling apparatus, comparing storage quantities of cash for each currency and each denomination in the cash handling apparatus, and excluding, from a target of the cash transport, one or more denominations in order from a denomination smallest in the storage quantity, thereby adjusting the transport amount to the upper-limit amount or less, and in a case that the cash transport is transport of cash with which a cash handling apparatus is replenished, comparing storage quantities of cash of each currency and each denomination in the cash handling apparatus, and excluding, from a target of the cash transport, one or more denominations in order from a denomination largest in the storage quantity, thereby adjusting the transport amount to the upper-limit amount or less.

* * * * *